United States Patent Office 3,410,871
Patented Nov. 12, 1968

3,410,871
PROCESS FOR THE PREPARATION OF
1,3-DIOXEP-5-ONES
August Sturzenegger and Joseph J. Zelauskas, Cedar Grove, N.J., assignors to Hoffmann-La Roche Inc., Nutley, N.J., a corporation of New Jersey
No Drawing. Filed Apr. 2, 1965, Ser. No. 445,255
5 Claims. (Cl. 260—338)

ABSTRACT OF THE DISCLOSURE

A process, including novel intermediates, for the preparation of known 2-$R_1$,$R_2$-1,3-dioxep-5-enes which comprises (1) condensing 2-butene-1,4-diol and a compound of the formula

to form an intermediate of the formula

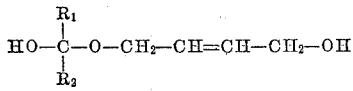

and (2) subsequently dehydrating the latter compound to form the desired dioxep-5-enes, is described. As used above, $R_1$ and $R_2$ are hydrogen, lower alkyl, lower alkenyl or phenyl, or taken together, are lower alkylene.

---

The present invention relates to a method of preparing known chemicals as well as to novel intermediates useful in the preparation of said known chemicals.

One purpose of this invention is to provide novel chemical intermediates of the formula:

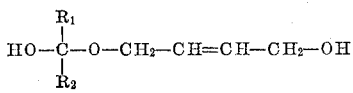   I wherein $R_1$ and $R_2$ are each a member of the group consisting of, individually, hydrogen, lower alkyl, lower alkenyl, phenyl and, taken together, lower alkylene.

Another purpose of this invention is to provide a method for the preparation of said compounds of Formula I.

Still another purpose of this invention is to provide a method for the preparation of the known compounds, 2-$R_1$,$R_2$-1,3-dioxep-5-ene wherein $R_1$ and $R_2$ have the same meaning as above, from said compounds of Formula I.

As used herein the term lower alkyl represents both straight and branched chain saturated hydrocarbon groups such as methyl, ethyl, propyl, isopropyl and the like. The term lower alkenyl comprehends both straight and branched chain unsaturated hydrocarbon groups such as 2-propenyl and the like. The term lower alkylene comprehends both straight and branched chain saturated hydrocarbon groups having two terminal carbon atoms, such as a polymethylene, for example, pentamethylene.

According to one aspect of this invention a compound of Formula I is prepared by condensation of cis-2-butene-1,4-diol and a compound of the formula:

   II wherein $R_1$ and $R_2$ have the same meaning as above. More particularly, it has been found that by reacting a compound of Formula II with cis-2-butene-1,4-diol there is directly obtained a high yield of a compound of Formula I. Preferred as starting materials are compounds of Formula II wherein at least one of $R_1$ and $R_2$ is hydrogen. An especially preferred starting material is isobutyraldehyde.

The reaction between cis-2-butene-1,4-diol and a compound of Formula II is conducted in the liquid state, preferably at a temperature below about 50° C. It is also preferable to react an equimolar quantity of the two reagents, but an excess of either can be used. The reaction can be conducted using no other ingredient in the reaction medium besides the reagents, but the reaction can also be conducted in the presence of an anhydrous medium inert to the reagents. Such an anhydrous medium which is inert to the reagents can, for example, be selected from the group consisting of polyalkylene glycol ethers, aromatic hydrocarbons such as benzene, toluene, xylene, cumene or the like, and lower alkyl ethers such as diethyl ether or the like. As indicated, however, the reaction can be conducted without the addition of any such medium to the reagents. In an especially preferred embodiment a compound of Formula II wherein at least one of $R_1$ and $R_2$ is hydrogen is added to the cis-2-butene-1,4-diol at a rate such that the temperature of the reaction mixture does not exceed about 50° C. The above-described reaction gives a high yield of a compound of Formula I. An especially advantageous aspect of the reaction is that the desired compound of Formula I is obtained substantially free of the 2-butene-1,4-diol starting material, as well as substantially free of the starting material of Formula II. Compounds of Formula I obtained by this procedure are, for example, acetone 4-hydroxy-2-buten-1-yl hemiacetal, formaldehyde 4-hydroxy-2-buten-1-yl hemiacetal, benzaldehyde 4-hydroxy-2-buten-1-yl hemiacetal, isobutyraldehyde 4-hydroxy-2-buten-1-yl hemiacetal, cyclohexanone 4-hydroxy-2-buten-1-yl hemiacetal and crotonaldehyde 4-hydroxy-2-buten-1-yl hemiacetal. Preferred are those compounds of Formula I derived from aldehydes.

Though the above description mentions only cis-2-butene-1,4-diol per se, mixtures of the cis and trans forms can also be used for the above-described reaction.

In a separate aspect of this invention the so-obtained compound of Formula I is dehydrated to yield 2-$R_1$,$R_2$-1,3-dioxep-5-ene wherein $R_1$ and $R_2$ have the same meaning as above. This dehydration is suitably effected by treating the compound of Formula I with a catalytic amount of a nonoxidizing acidic catalyst such as a strong organic or inorganic acidic catalyst, for example, organic sulfonic acids such as lower alkyl sulfonic acids, e.g., methane sulfonic acid or ethanesulfonic acid; lower alkylphenyl sulfonic acids, e.g., para-toluene sulfonic acid; sulfuric acid; di- or tri-chloro-lower alkanolic acids such as di- or tri-chloro-acetic acid; lower alkyl dicarboxylic acids such as oxalic acid, and the like. The dehydration is suitably conducted by treating the compound of Formula I with the acidic catalyst in the presence of a reaction medium at an elevated temperature. The reaction medium is suitably an organic compound inert to the compound of Formula I and which forms with water a two-phase minimum boiling point azeotrope, for example, ethyl acetate, diethyl ether, benzene, toluene, methylene chloride, or the like. The dehydration is then suitably effected at an elevated temperature, preferably at the boiling point of the azeotrope.

In order to obtain the desired 1,3-dioxep-5-ene in a maximum degree of purity, it is advantageous that the starting material compound of Formula I, if it is prepared in a reaction medium such as that described at page 3, lines 2–6 above, be prepared in a reaction medium easily separable from the desired end product. For this purpose the reaction medium, if different from the azeotrope former, should be such that it does not boil at the boiling point of the azeotrope formed in the dehydration step. Suitably, any such reaction medium should not boil within 20° C. of said azeotropic mixture.

A significant aspect of this invention is that the dehydration is conducted in a reaction step substantially separate from the reaction of the 2-butene-1,4-diol with the compound of Formula II, which reaction yields the novel intermediate compound of Formula I. It is preferable, once the reaction yielding the compound of Formula I is completed, to slowly add the so-formed compound of Formula I to a separate reaction vessel containing the acidic catalyst and the azeotrope former. Both the formation of a compound of Formula I and the dehydration thereof should be conducted in an atmosphere substantially free of oxygen. The addition of the compound of Formula I to the dehydration medium (i.e., the acidic catalyst and the azeotrope former) should preferably be done slowly in order to minimize the amount of unreacted compound of Formula I present in the reaction mixture at any given moment. Suitably, the rate of addition should be such that no more than 50% of the added compound of Formula I is unreacted at any point of time. Preferably, the rate of addition should be such that no more than 10 percent of the compound of Formula I is unreacted at any given time.

Proceeding from the starting materials, cis-2-butene-1,4-diol and a compound of Formula II, to the end product 1,3-dioxep-5-ene, in two separate steps is a principal feature of this invention. Advantages gained are, for example, higher yields, purer product, fewer side reactions, greater economy, and facile industrial-scale utilization.

The above describes the novel intermediates and processes of this invention. The following examples are offered as illustrative but not limitative thereof. Variations in technique and conditions will be apparent to those skilled in the art and are within the scope of the present invention. In the following examples all temperatures are stated in degrees centigrade.

Example 1.—Preparation of isobutyraldehyde 4-hydroxy-2-buten-1-yl hemiacetal 865 g. of isobutyraldehyde is added dropwise, under a nitrogen atmosphere, to 1057 g. of cis-2-butene-1,4-diol (consisting predominantly of the cis-isomer, i.e., approximately 92–96% by weight cis-isomer). The temperature of the reaction is maintained between 30° and 33°. There is thus obtained isobutyraldehyde 4-hydroxy-2-buten-1-yl hemiacetal as a colorless liquid which has a viscosity of 45–48 cp. (at 20°) and a density of 1.01 g./cc. (at 20°). The so-obtained isobutyraldehyde 4-hydroxy-2-buten-1-yl hemiacetal is substantially completely free of isobutyraldehyde. It is also substantially completely free of cis-2-butene-1,4-diol.

Example 2.—Preparation of 2-isopropyl-1,3-dioxep-5-ene

Isobutyraldehyde 4 - hydroxy - 2-buten-1-yl hemiacetal obtained in Example 1 above is added, under a nitrogen atmosphere, to a refluxing mixture of 1800 cc. of benzene and 3.1 g. of para-toluenesulphonic acid. The rate of addition is such that no more than 10% of the added hemiacetal is unreacted at any given point. When the theoretical amount (216 cc.) of water has been removed, the mixture is cooled to 25° and the acidic catalyst is neutralized with 1.0 g. of sodium methylate. The product is then isolated by fractionation through a fractionating column giving a high yield of very pure 2-isopropyl-1,3-dioxep-5-ene, B.P.$_{100}$=105°, N$_D^{25}$=1.4472–1.4474.

We claim:
1. A process for the preparation of 2-$R_1$,$R_2$-1,3-dioxep-5-ene wherein $R_1$ and $R_2$ have the same meaning as below which comprises the steps of:
   (a) reacting 2-butene-1,4-diol with a compound of the formula

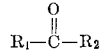

wherein $R_1$ and $R_2$ are each a member of the group consisting of, individually, hydrogen and lower alkyl, in the absence of a catalyst at a temperature below about 50° C.;
   (b) adding the so-formed compound of the formula

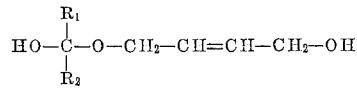

wherein $R_1$ and $R_2$ have the same meaning as above, to a reaction medium comprising an acidic catalyst at such a rate that no more than 50 percent of the added compound is unreacted at any point of time; and
   (c) removing water as formed.

2. A process according to claim 1, wherein the reaction medium also comprises an inert organic compound which forms with water a two-phase minimum boiling point azeotrope, and wherein water is removed as the azeotrope.

3. A process for the preparation of 2-isopropyl-1,3-dioxep-5-ene which comprises the steps of:
   (a) reacting 2-butene-1,4-diol with isobutyraldehyde in the absence of a catalyst at a temperature below about 50° C.
   (b) adding the so-formed isobutyraldehyde 4-hydroxy-2-buten-1-yl hemiacetal to a reaction medium comprising an acidic catalyst at such a rate that no more than 50 percent of the added compound is unreacted at any point of time; and
   (c) removing water as formed.

4. A process according to claim 3 wherein the reaction medium also comprises an inert organic compound which forms with water a two-phase minimum boiling point azeotrope, and wherein water is removed as the azeotrope.

5. A process according to claim 4, wheerin the inert organic compound is benzene.

References Cited

UNITED STATES PATENTS 2,657,241  10/1953  Mast et al. _____ 260—611
2,860,963  11/1958  Ellis et al. _____ 260—615 XR

OTHER REFERENCES

Brewster: Organic Chemistry (1948), p. 155.
Brannock et al.: Jour. of Org. Chem., vol. 21 (1956), pp. 1366–8.
Pattison: Jour. of Org. Chem., vol. 22, (1957), pp. 662–4.

BERNARD HELFIN, *Primary Examiner.*

PO-1050
(5/69)

UNITED STATES PATENT OFFICE
CERTIFICATE OF CORRECTION

Patent No. 3,410,871    Dated November 12, 1968

Inventor(s) August Sturzenegger and Joseph J. Zelauskas

It is certified that error appears in the above-identified patent and that said Letters Patent are hereby corrected as shown below:

Column 1, lines 2 and 3, in the title, "PROCESS FOR THE PREPARATION OF 1,3-DIOXEP-5-ONES" should read: PROCESS FOR THE PREPARATION OF 1,3-DIOXEP-5-ENES.

Column 1, lines 16-18, 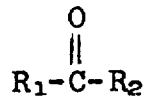 "$R_1-\overset{O}{\underset{|}{C}}-R_2$" should read:

$$R_1-\overset{\overset{O}{\|}}{C}-R_2$$

SIGNED AND
SEALED
AUG 25 1970

(SEAL)
Attest:

Edward M. Fletcher, Jr.
Attesting Officer

WILLIAM E. SCHUYLER, JR.
Commissioner of Patents